US009644972B2

(12) United States Patent
Heckman et al.

(10) Patent No.: US 9,644,972 B2
(45) Date of Patent: May 9, 2017

(54) METHOD FOR TRACKING A PATH TAKEN BY A VEHICLE

(71) Applicant: TALLYSMAN WIRELESS INC., Ottawa (CA)

(72) Inventors: John Benjamin Heckman, Ottawa (CA); David Graham Powell, Kanata (CA); Gyles Panther, Stittsville (CA)

( * ) Notice: Subject to any disclaimer, the term of this patent is extended or adjusted under 35 U.S.C. 154(b) by 0 days.

(21) Appl. No.: 14/640,942

(22) Filed: Mar. 6, 2015

(65) Prior Publication Data
US 2016/0258757 A1    Sep. 8, 2016

(51) Int. Cl.
*G01C 21/20* (2006.01)
*G01S 19/51* (2010.01)
*H04W 4/04* (2009.01)

(52) U.S. Cl.
CPC .............. *G01C 21/20* (2013.01); *G01S 19/51* (2013.01); *H04W 4/046* (2013.01)

(58) Field of Classification Search
USPC ............... 340/988, 903, 989, 991, 992, 993; 701/300, 25, 408, 472, 500, 24, 517
See application file for complete search history.

(56) References Cited

U.S. PATENT DOCUMENTS

| | | | | |
|---|---|---|---|---|
| 4,758,959 A * | 7/1988 | Thoone | .................. | G01C 21/30 340/990 |
| 5,058,023 A * | 10/1991 | Kozikaro | ............... | G01C 21/28 33/356 |
| 5,572,449 A * | 11/1996 | Tang | .................. | B60K 31/0008 180/170 |
| 5,841,366 A * | 11/1998 | Yamamoto | ............ | G01S 13/931 180/168 |
| 5,941,934 A * | 8/1999 | Sato | ........................ | G01C 21/30 340/995.22 |
| 6,012,013 A * | 1/2000 | McBurney | .............. | G01S 19/13 340/988 |
| 6,029,111 A * | 2/2000 | Croyle | .................. | G01C 21/165 701/468 |
| 6,360,162 B1 * | 3/2002 | Meis | ........................ | G08G 1/20 340/990 |
| 6,426,709 B1 * | 7/2002 | Becker | ................. | G08G 1/0104 340/988 |
| 6,728,392 B1 * | 4/2004 | Joshi | ..................... | G06K 9/6204 382/104 |
| 6,826,478 B2 * | 11/2004 | Riewe | ..................... | G01S 19/47 340/988 |
| 6,845,318 B1 * | 1/2005 | Moore | .................... | G01C 21/20 340/990 |

(Continued)

*Primary Examiner* — Thomas Tarcza
*Assistant Examiner* — Richard Goldman
(74) *Attorney, Agent, or Firm* — Brion Raffoul (57) ABSTRACT

Systems, methods, and devices relating to tracking a vehicle on its journey. At predetermined reporting time intervals, the vehicle's location is determined using GNSS and a current vector is calculated based on a current location and an immediately preceding location. The difference between the current vector and the immediately preceding vector is then determined and this difference is stored in the data packet. The data packet is transmitted to the base station using a two-way radio data link at select predetermined transmission time intervals. The data in the data packet is encoded to minimize the number of bits needed to store each data point.

13 Claims, 5 Drawing Sheets

(56) References Cited

U.S. PATENT DOCUMENTS

| | | | | |
|---|---|---|---|---|
| 7,650,227 B2* | 1/2010 | Kirk | G01S 19/14 | 340/995.13 |
| 2003/0040849 A1* | 2/2003 | Hathout | B60K 28/165 | 701/1 |
| 2004/0102896 A1* | 5/2004 | Thayer | G08G 1/207 | 701/522 |
| 2004/0122587 A1* | 6/2004 | Kanemitsu | B60W 40/04 | 701/300 |
| 2004/0254698 A1* | 12/2004 | Hubbard | G08G 1/0104 | 701/32.7 |
| 2005/0043882 A1* | 2/2005 | Takazawa | B60T 8/172 | 701/25 |
| 2005/0222716 A1* | 10/2005 | Tengler | G01C 21/26 | 701/1 |
| 2006/0058957 A1* | 3/2006 | Hickenlooper | B61L 25/025 | 701/408 |
| 2007/0265777 A1* | 11/2007 | Munakata | G01C 21/26 | 701/301 |
| 2008/0082261 A1* | 4/2008 | Tengler | B60R 16/00 | 701/414 |
| 2008/0300745 A1* | 12/2008 | Goossen | G05D 1/0044 | 701/25 |
| 2009/0088977 A1* | 4/2009 | Yasuhara | G08G 1/005 | 701/494 |
| 2009/0164067 A1* | 6/2009 | Whitehead | A01B 79/005 | 701/41 |
| 2009/0248291 A1* | 10/2009 | Poppen | G08G 1/096816 | 701/532 |
| 2010/0036595 A1* | 2/2010 | Coy | G08G 1/0104 | 701/119 |
| 2010/0082180 A1* | 4/2010 | Wright | B60W 50/0098 | 701/1 |
| 2010/0256836 A1* | 10/2010 | Mudalige | G08G 1/22 | 701/2 |
| 2010/0286884 A1* | 11/2010 | Bunn | B60W 30/18072 | 701/70 |
| 2011/0010023 A1* | 1/2011 | Kunzig | G01S 5/16 | 701/2 |
| 2011/0072072 A1* | 3/2011 | Rapo | A63F 13/355 | 709/203 |
| 2011/0125402 A1* | 5/2011 | Mitsugi | G01C 21/20 | 701/532 |
| 2011/0264302 A1* | 10/2011 | Tsunekawa | B60W 40/072 | 701/1 |
| 2011/0286658 A1* | 11/2011 | Mitsui | G01N 21/95684 | 382/149 |
| 2011/0288772 A1* | 11/2011 | Tanino | G01C 21/165 | 701/472 |
| 2013/0028174 A1* | 1/2013 | Cabos | H04L 51/063 | 370/316 |
| 2013/0261856 A1* | 10/2013 | Sharma | B61L 25/025 | 701/19 |
| 2013/0317676 A1* | 11/2013 | Cooper | B61L 3/121 | 701/20 |
| 2014/0088860 A1* | 3/2014 | Poornachandran | G01C 21/16 | 701/410 |
| 2014/0129060 A1* | 5/2014 | Cooper | B61L 15/0027 | 701/19 |
| 2014/0214265 A1* | 7/2014 | Ashton | G07C 5/0816 | 701/33.5 |
| 2014/0229501 A1* | 8/2014 | Josefiak | G06Q 10/08 | 707/769 |
| 2014/0257686 A1* | 9/2014 | Feldman | G06F 17/00 | 701/300 |
| 2014/0277898 A1* | 9/2014 | Nelson, Jr. | G01C 21/362 | 701/25 |
| 2014/0350834 A1* | 11/2014 | Turk | B60R 1/00 | 701/300 |
| 2014/0372022 A1* | 12/2014 | Witmer | G01C 21/32 | 701/423 |
| 2015/0142248 A1* | 5/2015 | Han | G01C 21/3602 | 701/23 |
| 2015/0222859 A1* | 8/2015 | Schweid | G06K 9/00624 | 348/148 |
| 2015/0266508 A1* | 9/2015 | Yoshihata | B62D 15/025 | 701/41 |
| 2015/0298621 A1* | 10/2015 | Katoh | B60R 11/04 | 348/148 |
| 2016/0033292 A1* | 2/2016 | Duan | G01C 21/34 | 701/533 |
| 2016/0212589 A1* | 7/2016 | Cawse | H04W 4/028 | |

\* cited by examiner

METHOD FOR TRACKING A PATH TAKEN BY A VEHICLE

TECHNICAL FIELD

The present invention relates to telecommunications used for tracking vehicles. More specifically, the present invention relates to methods, systems, and devices for determining routes taken by a vehicle in its journey.

BACKGROUND OF THE INVENTION

Fleets of vehicles with specific tasks, such as school buses, garbage trucks, and delivery vehicles, often need to be tracked to ensure that, among other things, their drivers are performing their appointed tasks. However, such tracking need not be real-time tracking as the operators of these fleets only need to know that each vehicle has performed its rounds and that specific events, such as the lowering of gates on school buses or the opening and closing of delivery doors on delivery trucks, have properly occurred.

So called telematics devices are widely used to service the above needs. Current telematics technology for tracking vehicle fleets commonly use Global Navigation Satellite System (GNSS) receivers coupled with two way communications systems such as cellular radio or two way mobile radios to periodically transmit location and telemetry data to a remote telematic host computer that is further connected to the Internet. This telematics data is stored in a database within the telematics host computer and is provided to client software executing on remote work stations via the Internet. This data can be used to generate reports and presentations of the movements and activities of the vehicles on a graphical display.

These telematics devices may include subsystems which allow for the transmission of telemetry data to record telematics "events" related to vehicle hardware and/or "smart" GNSS events generated by algorithms designed to minimize outbound interrogation requests for data.

Two way mobile radio networks have considerably less bandwidth compared to cellular radio networks, so that minimizing data to be transmitted by way of the two-way radio is important. This problem is exacerbated by the time required by the network to coordinate and manage communication transactions. For example, in a typical trunked radio network, the data transmission time for a single GNSS location report might amount to approximately 150 ms, but the entire transmission time may approach the larger part of a second because of the call setup overhead.

Two way radio networks provide certain particular advantages for specific applications relative to cellular radio networks, including lower recurring costs, inherent one-to-many communications, and significantly better immunity to overload failures in emergency situations.

The requirement to track fleets of vehicles and communicate telemetry data is an increasingly common requirement. This has led to higher use of the limited data bandwidth on two-way radio networks, resulting in a need to reduce the amount of data transmitted for this purpose.

One common partial solution to this, for modern digital radio networks, is to increase the available data bandwidth through the addition of one or more channels dedicated solely to data communications. However, frequent location reports (e.g. every few seconds), or the aggregate of location reports from a large fleet of vehicles, even with low report rates, can fully occupy the entire bandwidth of such additional data channels. Also, the requirement for frequent changeovers from voice to data transmissions for transmission of location data significantly complicates the requirement that each radio be continuously available for voice communication.

Prior art systems use a number of techniques which can decrease the data bandwidth used for the transmission of locations and telemetry reports. One such system provides for transmission of multiple location reports in a single transmission so as to reduce the average call set-up time, with additional data manipulation techniques to minimize the number of bits transmitted.

However, each of these techniques has its own limitations and drawbacks.

From the above, there is therefore a need for methods that address the issues associated with two-way radio data transmissions, especially with respect to the frequent reporting of data from vehicle fleets.

SUMMARY OF INVENTION

The present invention relates to systems, methods, and devices provided for tracking a vehicle on a journey. At predetermined reporting time intervals, the vehicle's location is determined using GNSS data. A current displacement vector is calculated based on a current location and an immediately preceding location. The Location and current displacement vector is stored in a data packet. The vector difference between the current displacement vector and the immediately preceding displacement vector is then determined and this difference vector is stored in the data packet. The data packet is transmitted to the base station using a two-way radio data link at predetermined transmission time intervals. The data in the data packet is encoded to minimize the number of bits needed to store each data point. In mathematical terms, considering the vehicle position as a variable, the current vector represents a vehicle track velocity, while the difference vector represents the vehicle track acceleration.

In a first aspect, the present invention provides a method for logging a track travelled by a vehicle, the method comprising:
   a) determining an initial location for said vehicle;
   b) storing said initial location in a data packet;
   c) after a predetermined reporting time interval, determining a subsequent location for said vehicle,
   d) determining an initial displacement vector for said vehicle based on said initial location and said subsequent location;
   e) storing said initial displacement vector in a data packet;
   f) at intervals of the predetermined reporting time interval, executing steps f1)-f4):
      f1) determining a new location for said vehicle;
      f2) determining a new displacement vector based on said new location and an immediately preceding location;
      f3) determining a vector difference between said new displacement vector and an immediately preceding displacement vector; and
      f4) storing said difference vector in said data packet.

In a second aspect, the present invention provides a method for recreating a path taken by a vehicle on a journey, the method comprising:
   a) retrieving a data packet compiled during said journey;
   b) retrieving an initial location from said data packet;
   c) retrieving an initial displacement vector from said data packet;

d) determining a current location based on said initial displacement vector, said initial location;

e) repeating steps e1)-e3):
   e1) retrieving a difference vector from said data packet;
   e2) determining a current displacement vector based on said difference vector and an immediately preceding displacement vector; and
   e3) determining a new current location based on said current displacement vector, an immediately preceding location.

In a third aspect, the present invention provides computer readable media having encoded thereon computer readable instructions which, when executed by a data processing system, implements a method for logging a track travelled by a vehicle, the method comprising:
   a) determining an initial location for said vehicle;
   b) storing said initial location in a data packet;
   c) after a predetermined reporting time interval, determining a subsequent location for said vehicle,
   d) determining an initial displacement vector for said vehicle based on said initial location and said subsequent location;
   e) storing said initial displacement vector in a data packet;
   f) at intervals of the predetermined reporting time interval, executing steps f1)-f4):
      f1) determining a new location for said vehicle;
      f2) determining a new displacement vector based on said new location and an immediately preceding location;
      f3) determining a vector difference between said new displacement vector and an immediately preceding displacement vector; and
      f4) storing said difference vector in said data packet.

In a fourth aspect, the present invention provides computer readable media having encoded thereon computer readable instructions which, when executed by a data processing system, implements a method for recreating a path taken by a vehicle on a journey, the method comprising:
   a) retrieving a data packet compiled during said journey;
   b) retrieving an initial location from said data packet;
   c) retrieving an initial displacement vector from said data packet;
   d) determining a current location based on said initial displacement vector and said initial location;
   e) repeating steps e1)-e3):
      e1) retrieving a difference vector from said data packet;
      e2) determining a current displacement vector based on said difference vector and an immediately preceding displacement vector; and
      e3) determining a new current location based on said current displacement vector, and an immediately preceding location.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
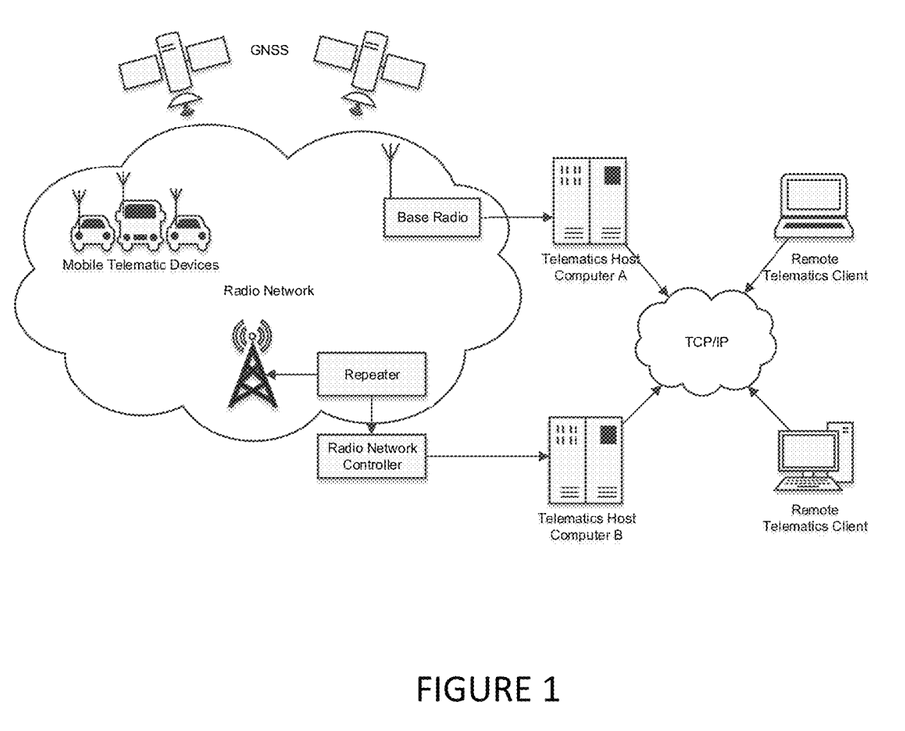
FIG. 1 is a block diagram of an environment in which the invention may be used.

Referring to FIG. 1, a block diagram of an environment in which the invention may be used is illustrated. As can be seen, the position of mobile telematics devices deployed on vehicles is determined from data output by GNSS receivers. Telematics data including the locations of the vehicles is then transmitted by way of the radio network to a host computer, either (A) connected to a base radio, or (B) connected directly to the radio network computer. The data transmitted to the host computer(s) is then made available to remote telematics clients by way of a network.

Figure 2:
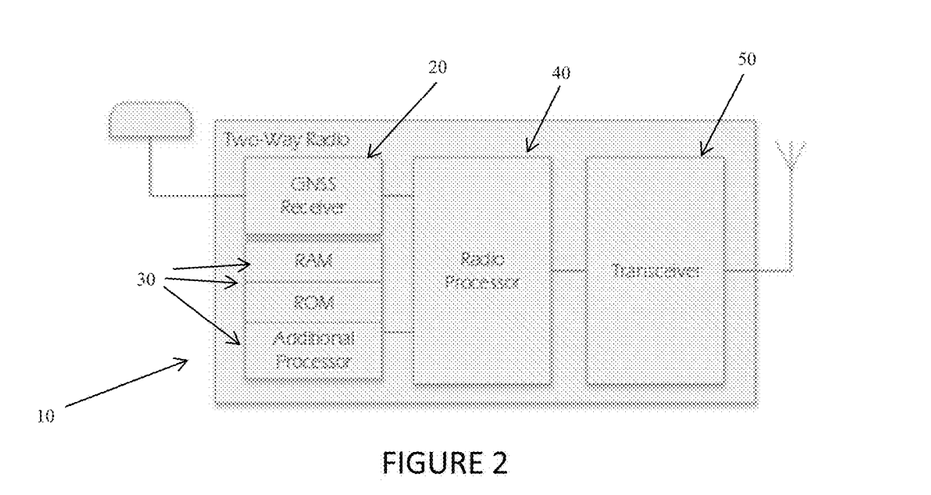
FIG. 2 is a block diagram of a system which may be used to implement the invention.

Referring to FIG. 2, a block diagram of a system which may include the invention is presented. The system 10 integrates a location reporting subsystem with a transceiver for receiving and transmitting data by way of the radio network. The system 10 includes a GNSS receiver 20, a data processor 30, and a radio processor 40. GNSS data output from the GNSS receiver is first processed by the data processor 30, prior to being input to the radio processor 40 for transmission to the radio network or to the base station radio by way of the transceiver 50.

Figure 3:
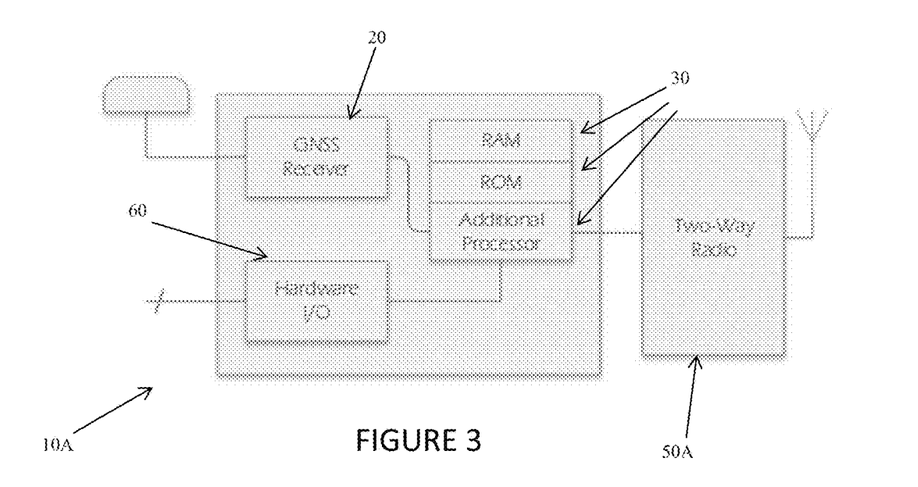
FIG. 3 is a block diagram of another system which may be used to implement the invention.

Referring to FIG. 3, a block diagram of another system which may include the invention is illustrated. In FIG. 3, the system 10A includes a subsystem which may be coupled to a two-way radio to provide the two-way radio with telematics capabilities. The system 10A includes a GNSS receiver, a data processor 30, and hardware 60 for receiving and sending data to a vehicle's subsystems (e.g. sensors and controls). GNSS data output from the GNSS receiver is first processed by the data processor 30 prior to being input to the radio processor 40 for transmission to the radio network or to the base station radio by way of the two-way radio 50A.

Each system which includes the invention frequently determines the vehicle's current position by reading location data output by a GNSS receiver. These frequent determinations of the vehicle's position are executed at predetermined position time intervals, these position time intervals being less than reporting time intervals.

In one aspect, the present invention provides a method for encoding a vehicle's path on a journey. The method is designed to minimize the number of bits required to encode and store a series of instantaneous vehicle positions that approximate the path travelled.

In this method, an initial position and an initial displacement vector are first determined and stored, then vector differences between two displacement vectors are determined and stored, with each of the displacement vectors being based on the vehicle's instantaneously current and instantaneously previous locations. If the vehicle is stopped or travelling in a straight line, the value of the difference vector is minimal and, as such, the number of bits needed to encode and/or store this difference is minimized. It should be noted that, using this method, the stored vehicle track can be used to recreate the path taken by the vehicle on its journey.

In one aspect, the above method for tracking a vehicle is suitable for systems which require a location reading at specific reporting time intervals (e.g. every 10 seconds). The method creates a series of data elements designated "tracks", each track approximating a part of the journey, the whole journey being described by the totality of tracks. The tracks so created define a further series of instantaneous locations of the vehicle at predetermined reporting intervals, such that the track is comprised of portions of the journey travelled by the vehicle between location reports. At the beginning of each portion, a displacement vector is determined from the vehicle's instantaneously current location and instantaneously preceding location and the difference vector between the new displacement vector and the immediately preceding displacement vector is stored in a data packet. This data packet can be stored on the vehicle or it can be transmitted to the base station or to a suitable receiver by way of the two-way radio data link.

Figure 4:
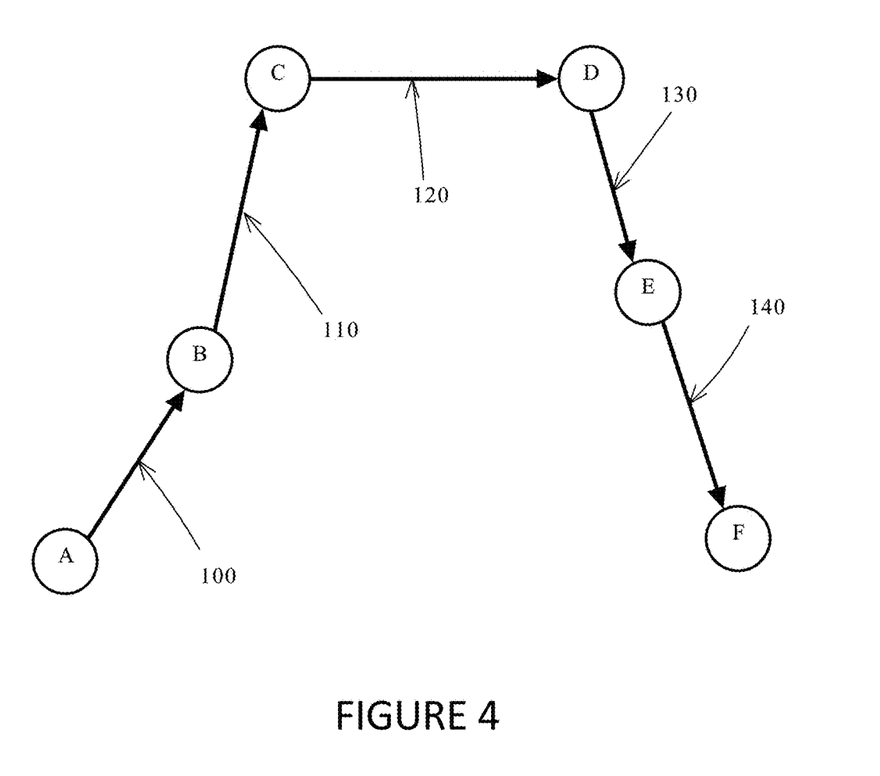
FIG. 4 is an example track used to explain one aspect of the invention.

To better explain the method, FIG. 4 is provided. Referring to FIG. 4, an initial location for the vehicle is determined at point A and is stored in a data packet. An initial displacement vector 100 is determined as the vector difference between the coordinates of point A and point B. This initial displacement vector 100 is stored in a data packet.

After point B, the vehicle travels to point C. At point C, the new displacement vector 110 is determined based on the coordinates of points B and C. As with points A and B, the new displacement vector is based on the difference between the coordinates of the current position (point C) and the immediately preceding position (point B). Once the current displacement vector is determined, a vector difference between the current displacement vector (vector 110 in this example) and the immediately preceding displacement vector (vector 100 in this example) is determined. This difference vector is then stored in the data packet.

At the next location, point D, the new displacement vector 120 is calculated by, again, taking the vector difference of the coordinates for the current position (point D) and the immediately preceding position (point C). The vector difference between the current displacement vector 120 and the immediately preceding displacement vector 110 is then calculated and the difference vector stored in the data packet.

When the vehicle reaches point E, the new displacement vector 130 is calculated from the coordinates of points D and E and the difference between displacement vector 130 and the immediately preceding displacement vector 120 is calculated and stored in the data packet. From point F, the new displacement vector 140 is calculated and the difference vector between the current displacement vector 140 and the immediately preceding displacement vector 130 is calculated and stored in the data packet. It should be noted that since the immediately preceding displacement vector 130 is similar to the new displacement vector 140, then the difference between these two vectors is minimal. Encoding and storing this difference will therefore require a minimal number of bits.

At point F, the data packet will at least have:
full location parameters for point A
full parameters for displacement vector 100
difference vector between displacement vector 100 and displacement vector 110
difference vector between displacement vector 110 and displacement vector 120
difference vector between displacement vector 120 and displacement vector 130
difference vector between displacement vector 130 and displacement vector 140

For the duration corresponding to generation of a track data element approximating at least a part of the vehicle's journey, some or all of the position data periodically output by the GNSS receiver may be stored, so that the coordinates of any point between the initial location and the ending location of a track may be known to the system by simply querying the data processor memory.

To recreate the path taken by the vehicle using the data in the data packet, the track is started at point A. Since full location parameters have been stored for point A, locating point A on a map or on a track is straightforward. The location of point B is derived by simply adding the displacement vector 100 to the known location for point A. To find the location of point C, the stored difference vector between displacement vector 100 and displacement vector 110 is added to the known displacement vector 100 to arrive at displacement vector 110. This displacement vector 110 is then added to the derived location for point B to derive the location of point C. To derive the location for point D, the stored difference vector between displacement vector 120 and displacement vector 110 is added to the calculated displacement vector 110 to arrive at displacement vector 120. Calculated displacement vector 120 is then added to the derived point C to derive the location for point D. To find point E, the stored difference vector between displacement vector 120 and displacement vector 130 is added to the calculated displacement vector 120 to arrive at displacement vector 130. Vector 130 is then added to the derived point D to derive the location of point E.

It should be noted that the track for the journey illustrated in FIG. 4 may only represent a portion of a journey for the vehicle. A journey can have multiple tracks and each track can have multiple sections. It should also be noted that each data packet may have multiple tracks. Depending on the configuration of the system, data packets can be scheduled for transmission at specific transmission time intervals or they can be transmitted once specific system parameters are confirmed (e.g. storage is almost full). Or, in a variant, the data packets can be stored on the system and downloaded once the vehicle has reached its destination or a base station.

To explain the method using variables, the displacement vector $D(x)$ is calculated using the coordinates of locations or points $P(x-1)$ and $P(x)$ with $P(0)$ and $D(1)$ being provided in the data packet. The difference vector $dD(x)$ is the difference between $D(x)$ and $D(x-1)$.

To recreate a vehicle's journey, the coordinates of $P(0)$ are retrieved along with $D(1)$, the predetermined reporting time interval, and any relevant scaling factors. $P(1)$ is calculated as the addition of $P(0)$ and the displacement vector $D(1)$. The difference vector $dD(2)$ is retrieved and added to the displacement vector $D(1)$ to compute displacement vector $D(2)$. Location $P(2)$ is computed by the addition of $D2$ to the location P1 The difference vector $dD(3)$ is retrieved and added to the displacement vector $D(2)$ to yield displacement vector $D(3)$.

This process can be generalized such that, to obtain the coordinates of point $P(x)$, one retrieves difference vector $dD(x)$. This difference vector $dD(x)$ is added to displacement vector $D(x-1)$ to result in current displacement vector $D(x)$. The coordinates of point $P(x-1)$ is then added to the current displacement vector $D(x)$ to yield current point $P(x)$.

It should be noted that the configuration of data packets may take multiple forms. In one implementation, the data packets are subdivided into different sections and are continuously encoded and re-encoded if a more efficient encoding can be achieved.

Figure 5:
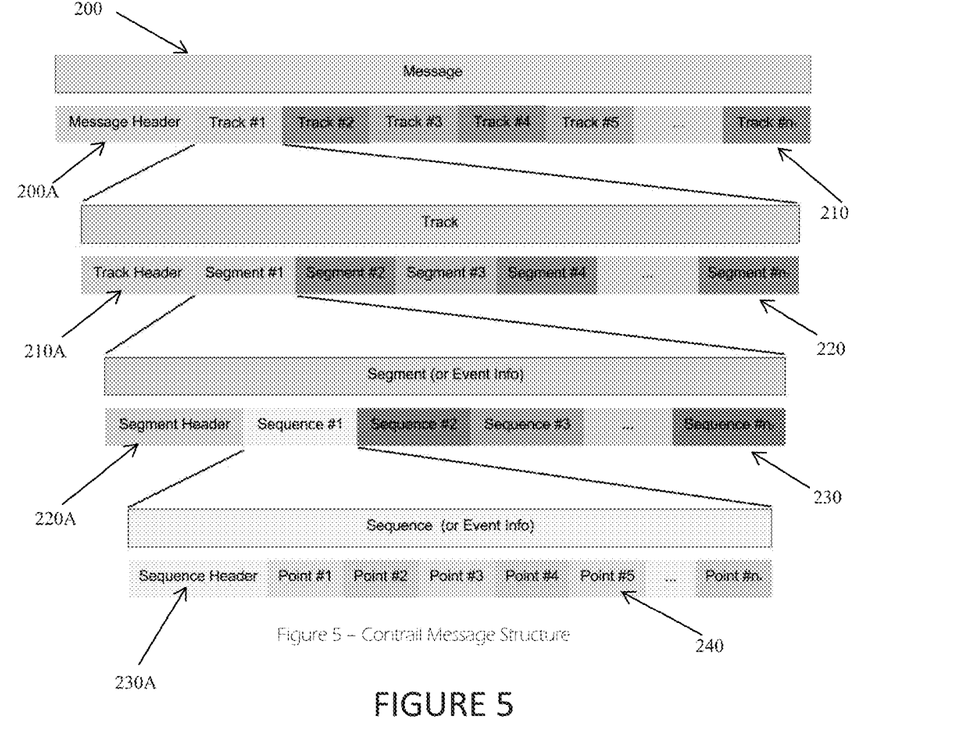
FIG. 5 is a schematic of the different portions of a data packet according to one aspect of the invention.

Referring to FIG. 5, a schematic of a data packet according to one aspect of the invention is illustrated. A data packet 200 is subdivided into tracks 210 and each track is subdivided into segments 220. Each segment is subdivided into sequences 230 and each sequence is subdivided into points 240.

At the beginning of each subdivision of the data packet is a header which contains data to be applied when retrieving the contents of each subdivision. Thus, a message header 200A has data to be applied whenever data for a track is retrieved. Similarly, a track header 210A has data to be applied whenever segment data is to be retrieved and a segment header 220A has data to be applied whenever sequence data is to be retrieved. And, of course, a sequence header 230A has data to be applied whenever point data is to be retrieved.

Each header at least has data indicating how many block units of data are in the subdivision. As such, each message header details how many tracks are in the message. Each track header indicates how many segments there are in the track. Each segment header indicates how many sequences there are in the segment and, finally, each sequence header indicates how many points are encoded in that particular sequence.

The track header contains the detailed location information for the initial location. Thus, the coordinates of the initial location for that particular track is stored in the track header. It should be noted that each track data element encodes a specific portion of a journey. As an example, the track in FIG. 4 may be encoded as a track data element of a message. A succeeding track data element may represent a continuation of the journey and may start off at point F in FIG. 4.

It should also be noted that the track header may include a time stamp to indicate the time of application of the coordinates of the initial location. Scaling factors for, as examples, distance and time may also be present in the track header. Such scaling factors would be applied to vectors encoded stored in this particular track. Other tracks may have other scaling factors and such scaling factors would be applied to data in those tracks. Additionally as noted above, the track header would include data indicating how many segments were stored in that particular track.

Each segment has a specific segment header. The segment header includes data indicating how many sequences are stored in that particular segment. Additionally, the segment header includes the data that completely defines the initial displacement vector referred to above. For a two dimensional implementation, one field in the segment header would contain the north/south component of the vector while another field would contain the east/west component of the vector.

Each sequence has a sequence header containing data indicating how many points are encoded within that sequence. Each sequence header may also include optional encoding parameters that can be used to indicate how many bits were needed to encode the two or three components of the difference vectors encoded in the sequence. In one implementation, these encoding parameters are the number of bits needed to encode the each of the components of the difference vectors encoded in the sequence.

It should be clear that each point encoded in a sequence contains the components of a difference vector as explained above. In one implementation, the difference vector is encoded as having two components: one component is the latitude change in north/south while the other component is the longitude change in east/west.

In one implementation, the encoding method essentially starts a track by first finding the coordinates of the initial location. This, along with the time stamp and whatever scale factors are required, are stored in the data packet. A segment is then initiated with the initial displacement vector as detailed above. Similarly, a sequence is initialized and, if necessary, the encoding parameters are set and stored. Each point is then encoded and stored as the difference vectors are sequentially generated.

In the event that more bits are required to encode a current difference vector than the number of bits provisioned for, then a new sequence is initiated with a new sequence header containing a data field that provisions increased number of bits to be used in the new sequence. On the other hand if fewer bits are required to encode a current difference vector than the number of bits provisioned for, then a new sequence is initiated with a new sequence header containing a data field that provisions for fewer bits to be used in the new sequence. It should therefore be clear that different sequences may have different encoding parameters such that some sequences may require more bits per difference vector than other sequences. The encoding parameters for each sequence are used to decode that particular sequence.

To ensure that the data packet does not explode in size, size constraints may be implemented. As such, a maximum number of bits use to represent a component of a difference vector, a maximum number of bits used to encode a sequence header, a maximum number of segments per track, a maximum number of sequences in a segment, and a maximum number of points in a sequence are set in the system.

For clarity, once a section of a data packet exceeds a predetermined limit, then a new instance of that section is initiated. As an example, if the number of points in one sequence exceeds the limit of how many points there are to be per sequence, then a new sequence is initiated. Similarly, if the number of sequences in a segment exceeds the maximum allowable number of sequences in a segment, then a new segment is to be initiated.

Another method which may be used is to continuously check if more bits can be saved. Once the number of bits which could be saved exceeds a predetermined threshold, a new sequence is initiated a posteriori then the points in a sequence are re-encoded and a new sequence header, which uses less bits than the previous sequence header, is used.

It should be noted that, when recreating a vehicle's journey, the relevant difference vectors are retrieved from the data packet. Once the difference vectors have been retrieved from a segment, the last location from that segment becomes the initial location for the next segment. Since an initial displacement vector is stored in the next segment, the recreation of the journey can continue as the initial vector and an initial location are present.

In one implementation, each reporting time interval is set at 10 seconds while the position time interval is set at 1 second. In this variant, the reporting time interval is adjustable by the system and the adjusted reporting time interval is saved in the data packets as an adjusted reporting time interval. Appropriate adjustments to the position and location calculations are made to compensate for the adjusted reporting time interval. Such adjusted reporting time interval and any scaling factors are used to adjust for conditions which may change during the vehicle's journey.

It should be noted that the system may, depending on the conditions encountered during the journey, retroactively adjust the reporting time interval during the journey. For such a condition, the system might, using the data gathered, adjust the data stored in the data packets to provide greater granularity in the stored data or to increase the storage efficiency for the data packet. Thus, the system could revisit data previously gathered and, depending on the programmed parameters of the system, adjust the reporting time interval, store the adjusted reporting time interval, recalculate the various difference vectors stored, and store an entirely different data set in the data packet. Of course, the new data set would still document the previous portion of the journey detailed in the old data set but the new data set could have different difference vectors, different locations indicated by the difference vectors, and different initial locations for each track.

In a further aspect, this document discloses a method for logging a track travelled by a vehicle, the method comprising:
a) reading location data output by a GNSS (Global Navigation Satellite System) receiver to determine coordinates for an initial location for said vehicle;
b) using a data processor to store said initial location in a data packet;
c) after a predetermined reporting time interval, reading further location data output by said GNSS receiver to determine coordinates for a subsequent location for said vehicle;
d) using said data processor to calculate an initial displacement vector for said vehicle based on coordinates of said initial location and said subsequent location;
e) using said data processor to store said initial displacement vector in said data packet;
f) at predetermined reporting time intervals, executing steps f1)-f4):
  f1) reading output from said GNSS receiver to determine coordinates for a new location for said vehicle;
  f2) using said data processor to calculate a new displacement vector based on coordinates of said new location and an immediately preceding location;
  f3) using said data processor to calculate a difference vector between said new displacement vector and an immediately preceding displacement vector; and
  f4) using said data processor to store said difference vector in said data packet.

In a further aspect, this document discloses a computer readable media having encoded thereon computer readable instructions which, when executed by a data processing system, implements a method for logging a track travelled by a vehicle, the method comprising:
a) reading location data output by a GNSS (Global Navigation Satellite System) receiver to determine an initial location for said vehicle;
b) using a data processor to store said initial location in a data packet;
c) after a predetermined reporting time interval, reading further location data output by said GNSS receiver to determine coordinates for a subsequent location for said vehicle;
d) using said data processor to calculate an initial displacement vector for said vehicle based on coordinates of said initial location and said subsequent location;
e) using said data processor to store said initial displacement vector in said data packet;
f) at predetermined reporting time intervals, executing steps f1)-f4):
  f1) reading output from said GNSS receiver to determine coordinates for a new location for said vehicle;
  f2) using said data processor to calculate a new displacement vector based on coordinates of said new location and an immediately preceding location;
  f3) using said data processor to calculate a difference vector between said new displacement vector and an immediately preceding displacement vector; and
  f4) using said data processor to store said difference vector in said data packet.

It should be clear that, in one variant, the system stores the vehicle's position for each of the position time intervals for a given time frame. This data set, once gathered, can then be used by the system to recalculate and recalibrate the data in the data packet. These position locations and their data/time stamps can be used by the system to calculate an initial location, an initial displacement vector, difference vectors, and other associated data for each track to provide a suitable record of the vehicle's journey. The adjustable nature of the reporting time interval allows for the system to use different reporting time intervals for each track if necessary, to thereby provide for greater or lesser granularity. As noted above, different reporting time intervals (suitably stored in the data packet) can be used in the calculations of the time stamps for each reported position.

In another aspect, one variant of the invention can be considered as involving the generation of a series of position reports representing a sampled approximation of the path travelled by a vehicle on a journey. This generation of position reports calculates an algorithmic straight line construct, equivalent to a line drawn between a current reported position and the immediately previous reported position. As noted above, this variant repeatedly determines GNSS positions as position samples at a given position sampling rate. It also determines the deviation distances between each GNSS sample position, determined at or before the current position report and at or after the immediately previous position report, and any point on the straight line construct. Then, the maximum difference between the deviation distances and a predetermined maximum deviation threshold is determined. Differences between the deviation distance and a predetermined minimum deviation threshold are then found. Based on these calculations, the predetermined reporting interval is decreased if the maximum deviation exceeds the predetermined maximum threshold or the predetermined reporting interval is increased if the maximum deviation is less than the predetermined minimum threshold. This thereby controls the deviation between the actual path travelled by vehicle on the journey (as determined by position samples) and the path approximation represented as a series of line segments drawn between position reports. The end result is so as to minimize the amount of data required to describe the path travelled by the vehicle and as detailed in the periodic position reports.

Figure 6:
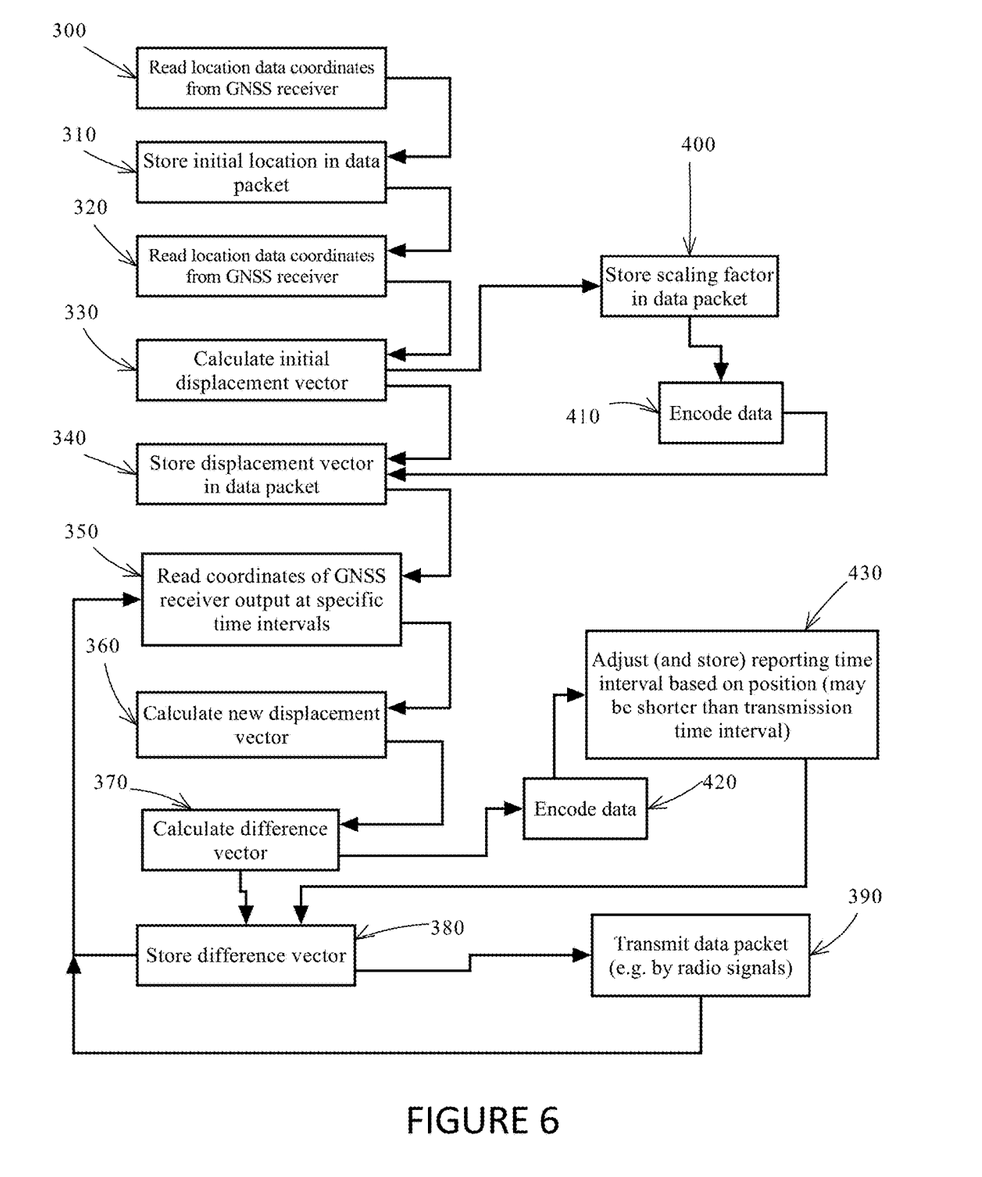
FIG. 6 is a flowchart detailing the steps in a method according to one aspect of the invention.

Referring to FIG. 6, a flowchart of a method according to one aspect of the invention is illustrated. The first step in the method is that of reading location data coordinates from a GNSS receiver (step 300) for an initial location of the vehicle. In step 310, this initial location coordinates are stored in a data packet using a data processor. A further location data output from the GNSS receiver is then read to find coordinates for a subsequent location for the vehicle (step 320). After this, the data processor is used to calculate (step 330) an initial displacement vector based on the coordinates from steps 300 and 320. The data processor is then used to store this initial displacement vector in the data packet (step 340). A loop is then executed with the first step in the loop being that of reading the output from the GNSS receiver to determine coordinates for a new location for the vehicle (step 350). This step of acquiring position data for the vehicle's position may be performed at specific position time intervals which may be shorter than the reporting time intervals. Step 360 then uses the data processor to calculate a new displacement vector based on the coordinates of the new location and an immediately preceding location. Once this new displacement vector has been calculated, the data processor is used to calculate a difference vector between the new displacement vector and the immediately preceding displacement vector (step 370). This difference vector is then stored in the data packet using the data processor (step 380). The loop then repeats by returning to step 350. At predetermined transmission time intervals, the data packet is transmitted to a base station, preferably using radio signals (step 390).

In one variant of the method illustrated in the flowchart of FIG. 6, a scaling factor is used to scale the displacement and difference vectors. This scaling factor can be stored in the data packet using the data processor (step 400). The data determined and gathered in the various steps of the method may be encoded prior to storage or being saved in the data packet (step 410) and this may be done once the data has been gathered, determined, or calculated. Similarly, the encoding of the data may also be performed in the middle of the loop (step 420) once the various coordinates and vectors have been determined, calculated, and gathered during the loop. In another variant, the reporting time interval may be adjusted by the system based on position data and this adjusted reporting time interval is stored in the data packet (step 430).

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A method for logging a track travelled by a vehicle, the method comprising:
 a) reading location data output by a GNSS (Global Navigation Satellite System) receiver to determine coordinates for an initial location for said vehicle;
 b) using a data processor to store said initial location in a data packet;
 c) after a predetermined reporting time interval, reading further location data output by said GNSS receiver to determine coordinates for a subsequent location for said vehicle;
 d) using said data processor to calculate an initial displacement vector for said vehicle based on coordinates of said initial location and said subsequent location;
 e) using said data processor to store said initial displacement vector in said data packet;
 f) at predetermined reporting time intervals, executing steps f1)-f4):
  f1) reading output from said GNSS receiver to determine coordinates for a new location for said vehicle;
  f2) using said data processor to calculate a new displacement vector based on coordinates of said new location and an immediately preceding location;
  f3) using said data processor to calculate a difference vector between said new displacement vector and an immediately preceding displacement vector; and
  f4) using said data processor to store said difference vector in said data packet.

2. A method according to claim 1 further including a step of transmitting said data packet to a base station at select predetermined transmission time intervals.

3. A method according to claim 2 wherein said data packet is transmitted using radio signals.

4. A method according to claim 1 wherein said initial location is determined by reference to at least one GNSS satellite communicating with said GNSS receiver.

5. A method according to 1 wherein data determined and gathered in claim 1 is encoded prior to being saved in said data packet.

6. A method according to claim 1 wherein for each iteration of steps f1)-f4), new displacement vectors are calculated as a vector difference between coordinates of said current location and said immediately preceding location.

7. A method according to claim 1 wherein said initial displacement vector is determined by calculating a vector difference between coordinates of said initial location and said subsequent location.

8. A method according to claim 1 further including a step of storing at least one scaling factor in said data packet, said at least one scaling factor being for scaling said displacement and difference vectors.

9. A method according to claim 2 wherein said predetermined reporting time interval is shorter than said predetermined transmission time intervals.

10. A method according to claim 1 wherein said predetermined reporting time interval is adjustable by said system.

11. A method according to claim 1 further comprising acquiring position data detailing said vehicle's position at specific position time intervals, said position time intervals being shorter than said reporting time intervals.

12. A method according to claim 10 wherein said system adjusts said predetermined reporting time interval based on said position data, an adjusted reporting time interval being stored in said data packet.

13. Computer readable media having encoded thereon computer readable instructions which, when executed by a data processing system, implements a method for logging a track travelled by a vehicle, the method comprising:
   a) reading location data output by a GNSS (Global Navigation Satellite System) receiver to determine an initial location for said vehicle;
   b) using a data processor to store said initial location in a data packet;
   c) after a predetermined reporting time interval, reading further location data output by said GNSS receiver to determine coordinates for a subsequent location for said vehicle;
   d) using said data processor to calculate an initial displacement vector for said vehicle based on coordinates of said initial location and said subsequent location;
   e) using said data processor to store said initial displacement vector in said data packet;
   f) at predetermined reporting time intervals, executing steps f1)-f4):
      f1) reading output from said GNSS receiver to determine coordinates for a new location for said vehicle;
      f2) using said data processor to calculate a new displacement vector based on coordinates of said new location and an immediately preceding location;
      f3) using said data processor to calculate a difference vector between said new displacement vector and an immediately preceding displacement vector; and
      f4) using said data processor to store said difference vector in said data packet.

* * * * *

UNITED STATES PATENT AND TRADEMARK OFFICE
CERTIFICATE OF CORRECTION

PATENT NO. : 9,644,972 B2
APPLICATION NO. : 14/640942
DATED : May 9, 2017
INVENTOR(S) : John Heckman et al.

It is certified that error appears in the above-identified patent and that said Letters Patent is hereby corrected as shown below:

In the Specification

At Column 3, Line 53 The "Summary" section should include the following paragraphs:
In a further aspect, this document discloses a method for logging a track travelled by a vehicle, the method comprising:
  a) reading location data output by a GNSS (Global Navigation Satellite System) receiver to determine coordinates for an initial location for said vehicle;
  b) using a data processor to store said initial location in a data packet;
  c) after a predetermined reporting time interval, reading further location data output by said GNSS receiver to determine coordinates for a subsequent location for said vehicle;
  d) using said data processor to calculate an initial displacement vector for said vehicle based on coordinates of said initial location and said subsequent location;
  e) using said data processor to store said initial displacement vector in said data packet;
  f) at predetermined reporting time intervals, executing steps f1)-f4):
    f1) reading output from said GNSS receiver to determine coordinates for a new location for said vehicle;
    f2) using said data processor to calculate a new displacement vector based on coordinates of said new location and an immediately preceding location;
    f3) using said data processor to calculate a difference vector between said new displacement vector and an immediately preceding displacement vector; and
    f4) using said data processor to store said difference vector in said data packet.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,644,972 B2

In a further aspect, this document discloses a computer readable media having encoded thereon computer readable instructions which, when executed by a data processing system, implements a method for logging a track travelled by a vehicle, the method comprising:
    a) reading location data output by a GNSS (Global Navigation Satellite System) receiver to determine an initial location for said vehicle;
    b) using a data processor to store said initial location in a data packet;
    c) after a predetermined reporting time interval, reading further location data output by said GNSS receiver to determine coordinates for a subsequent location for said vehicle;
    d) using said data processor to calculate an initial displacement vector for said vehicle based on coordinates of said initial location and said subsequent location;
    e) using said data processor to store said initial displacement vector in said data packet;
    f) at predetermined reporting time intervals, executing steps f1)-f4):
        f1) reading output from said GNSS receiver to determine coordinates for a new location for said vehicle;
        f2) using said data processor to calculate a new displacement vector based on coordinates of said new location and an immediately preceding location;
        f3) using said data processor to calculate a difference vector between said new displacement vector and an immediately preceding displacement vector; and
        f4) using said data processor to store said difference vector in said data packet.